UNITED STATES PATENT OFFICE.

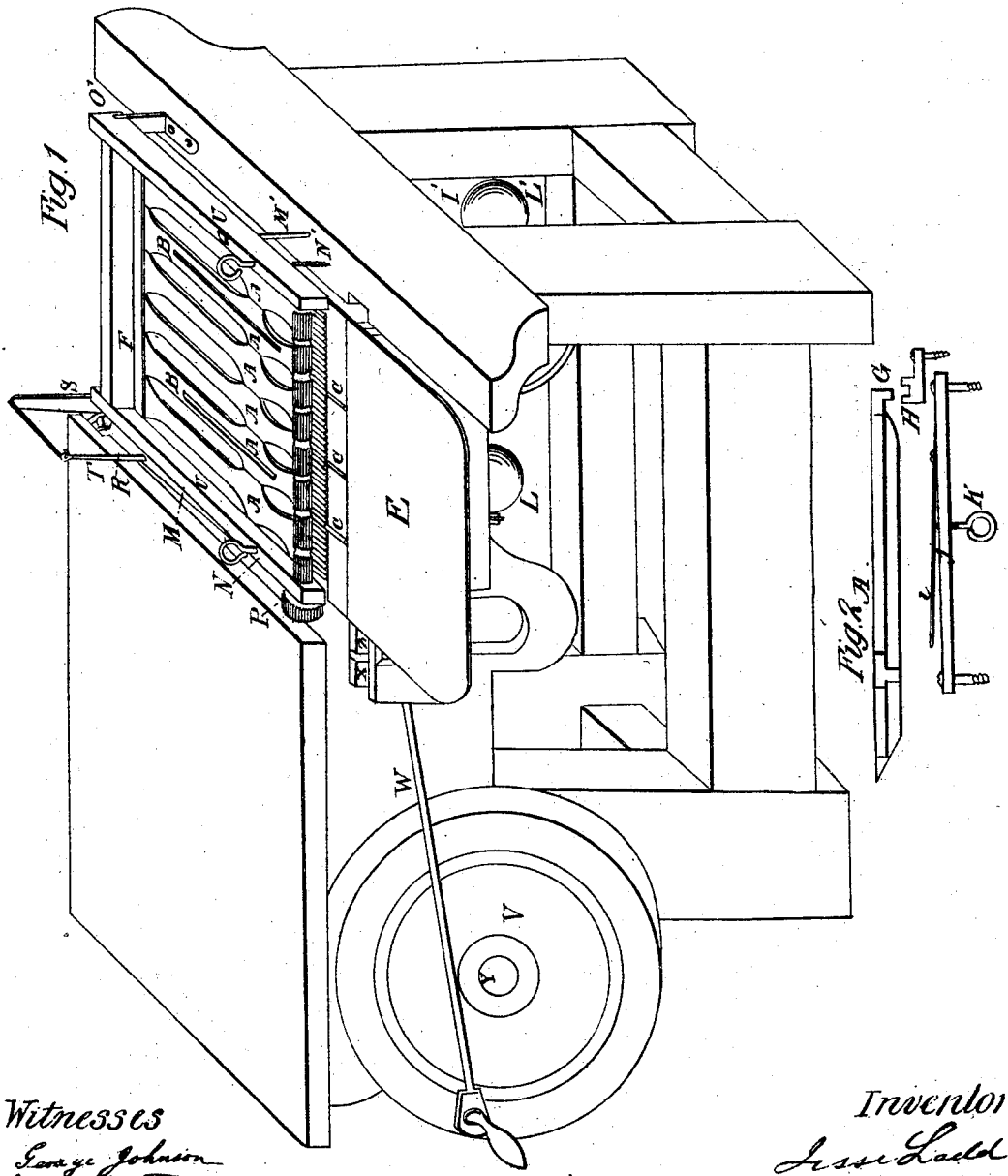

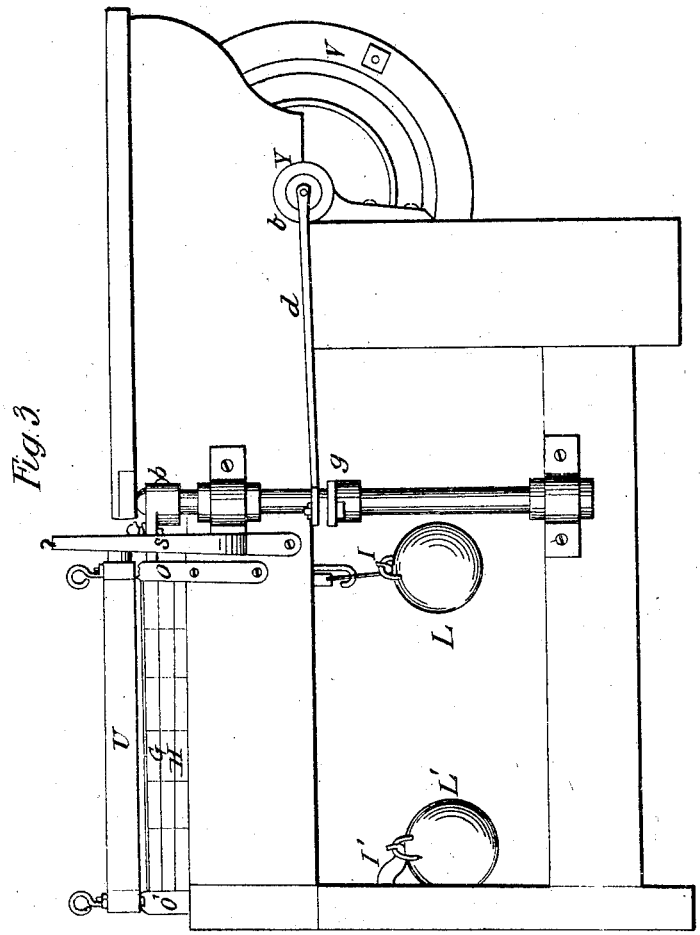

JESSE LADD, OF HOLDERNESS, NEW HAMPSHIRE.

MACHINE FOR POINTING SHOE-PEGS.

Specification of Letters Patent No. 16,280, dated December 23, 1856.

*To all whom it may concern:*

Be it known that I, JESSE LADD, of Holderness, in the county of Grafton and State of New Hampshire, have invented a new and useful Improvement on the Machine for Pointing Pegs; and I do hereby declare that the following is a full, clear, and exact description of the construction and operation of the same, reference being had to the annexed drawings, making a part of this specification, in which—

Figure 1 is an isometrical view of the machine with my said improvement, and Fig. 2 a longitudinal elevation of one of the fingers marked A in Fig. 1, of the vibrating bed showing its construction, and Fig. 3 is a longitudinal elevation of the opposite side of the machine to that shown in Fig. 1.

A A, &c., in Fig. 1 represent the fingers of a vibrating bed one of which is shown separately in Fig. 2. In an ordinary working machine there will be eight of these fingers, but there may be more or less, about two and one half inches broad and eighteen inches long. One end is grooved so that the ridges between the grooves shall assist in compelling the block to advance beneath the feed roller D. The other end, G, (Fig. 2) is constructed so as to fit into the socket H. The finger rests upon the spring $i$ attached to the permanent bed $j$ and capable of being adjusted by the set screw $k$. These fingers are confined in their sockets, H, by the bar F (Fig. 1) passing over them all and screwed down at the ends of the frame of the machine. One or more of these fingers are fitted on the upper surface with long low sharp ridges running lengthwise the finger and marked B, B, as shown in Fig. 1, for the purpose of guiding the block to be operated on, straight forward and prevent its turning while being cut. Upon the platform E are similar ridges C, C, C, for a like purpose. These operate also to prevent the block from turning after being cut the first time and when they are cut at right angles with the former direction, by fitting into the grooves first cut.

D (Fig. 1) is a fluted or toothed feed roller, operated by the ratchet wheel P, which is driven by a driver R, sustaining an upright arm T to which is attached the spring S, shown more fully in Fig. 3, acting to keep the end of the driver R against the under side of the ratchet wheel P. This is operated by the gearing shown in Fig. 3, attached to the shaft Y of the fly wheel V.

W is the shaft that carries the triangular cutting knife part of which is shown at Fig. 1 and marked Z. Sliding in a strong track way between the platform and the grooved ends of the fingers one end of which is marked $x$. This cutting tool turns slightly upon a pivot so that when the point in advancing strikes the block to be cut, it rises and penetrates the desired depth, and when retiring it drops so as to move easily back beneath the block.

U, U, is a frame resting upon the hinges O, O', (Fig. 3) at one end, so that the other end to which the feed roller is attached may move up and down. The roller is pressed upon the block by weights L, L', suspended from levers I I'. These levers rest upon the ends of the rods M, M' attached to the frame U. The distance between the feed roller and bed may be increased or diminished by the screws N and N', passing through the frame U, and resting on the frame of the machine.

In Fig. 3, $a$ is the drum where the power is applied, $b$ an eccentric attached to the shaft Y and imparting motion to the shaft $d$; this shaft operates the lever $g$ and that the upright shaft $f$ this finally moving backward and forward the lever $h$ by which the driver R is caused to operate the ratchet wheel of the feed roller.

Having thus described the construction of the machine I will proceed to describe its operation. A block of suitable form being placed upon the vibrating bed, the yielding fingers of which compensate for any inequalities of thickness, and pressed down upon the ridges B, B, it is pushed forward under the feed roller which carries it forward to the cutting tool. This knife driven by the shaft W, attached to the fly wheel V cuts as it advances parallel angular grooves in the block, equidistant from each other, and depending for that distance upon the ratchet wheel or stroke of the driver R, and the operation proceeds until the block has been completely gone over, at the same time reducing the block to a uniform thickness The block is then replaced upon the bed and again advanced to the feed roller so that the knife shall cut another series of parallel angular grooves at right angles with the former and guided straight forward by the ridges B B, and C, C, C. In order to cut pegs coarser or finer as may be required, the ratchet with coarser or finer teeth may be employed, also at the same time increasing or lessening the stroke of the driver R, acting upon the ratchet.

I do not claim the triangular knife nor the grinding ridges B B and C C C, nor the feed roller, but What I do claim as my invention and desire to secure by Letters Patent, is—

The employment of the fluted or toothed feed roller D, in combination with the vibrating bed composed of the fingers A, A, &c., operating in the manner and for the purpose substantially as hereinbefore set forth and described, or any other device operating substantially in the same manner.

JESSE LADD.

Witnesses:
GEORGE JOHNSON,
GEORGE S. BURTON.